United States Patent [19]
Morris

[11] Patent Number: 5,900,541
[45] Date of Patent: May 4, 1999

[54] SENSOR ASSEMBLY FOR EASY REMOVAL

[75] Inventor: C. Edward Morris, Columbus, Ind.

[73] Assignee: Cummins Engine Company, Inc., Columbus, Ind.

[21] Appl. No.: 08/892,269

[22] Filed: Jul. 14, 1997

[51] Int. Cl.⁶ .................................................. G01M 15/00
[52] U.S. Cl. ............................................ 73/116; 73/35.07
[58] Field of Search ............................... 73/35.01, 35.03, 73/35.06, 35.07, 116, 117.2, 117.3, 119 R

[56] References Cited

U.S. PATENT DOCUMENTS

| | | |
|---|---|---|
| 3,371,525 | 3/1968 | Mitchell . |
| 3,946,607 | 3/1976 | Panella . |
| 4,287,751 | 9/1981 | Yasuda et al. . |
| 4,307,603 | 12/1981 | Dobler et al. . |
| 4,414,531 | 11/1983 | Novak . |
| 4,596,132 | 6/1986 | Takami et al. . |
| 4,633,842 | 1/1987 | Ikeda et al. . |
| 4,644,926 | 2/1987 | Sakurai et al. . |
| 4,736,620 | 4/1988 | Adolph . |
| 4,763,630 | 8/1988 | Nagase et al. . |
| 4,995,256 | 2/1991 | Norlien et al. . |
| 5,126,617 | 6/1992 | Lukasiewicz et al. ............... 73/715 |
| 5,138,885 | 8/1992 | Okauchi et al. ............... 73/723 |
| 5,537,883 | 7/1996 | Okauchi et al. . |
| 5,540,086 | 7/1996 | Park et al. ............... 73/53.05 |
| 5,546,787 | 8/1996 | Hafele et al. ............... 73/31.05 |
| 5,559,280 | 9/1996 | Kovacich et al. ............... 73/35.13 |

FOREIGN PATENT DOCUMENTS 831166  2/1952  Germany .

*Primary Examiner*—Elizabeth L. Dougherty
*Assistant Examiner*—Eric S. McCall
*Attorney, Agent, or Firm*—Sixbey, Friedman, Leedom & Ferguson; Charles M. Leedom, Jr.; Tim L. Brackett, Jr.

[57] ABSTRACT

An improved sensor and sensor assembly is provided which permits the easy removal of the sensor from its mounting bore even in the presence of corrosive residue in the mounting bore. The sensor assembly includes an elongated sensor body having an annular tapered portion with a frusto-conical shape for positioning in a mounting bore having a complementary taper. As the sensor is removed from the mounting bore, the annular gap between the sensor and inner wall of the mounting bore will gradually increase at any point along the sensor body thereby increasingly separating any corrosive residue accumulated on the opposing surfaces. In addition, a seal assembly is provided which effectively vents gas pressure from the annular gap between the sensor and the mounting bore without damaging the seal and while ensuring the seal returns to its fully sealed position thereby preventing contaminants from entering the bore throughout engine operation.

20 Claims, 2 Drawing Sheets

SENSOR ASSEMBLY FOR EASY REMOVAL

TECHNICAL FIELD

The present invention relates to a sensor assembly for sensing an operating condition, i.e. pressure, in a machine, such as an internal combustion engine. The sensor assembly is designed to permit the sensor to be easily removed from the machine.

BACKGROUND OF THE INVENTION

Sensors are used in internal combustion engines to detect various engine operating conditions, such as cylinder pressure. These sensors are typically mounted in a mounting bore formed in a portion of the engine adjacent the engine environment to be sensed by the sensor.

For example, as shown in U.S. Pat. No. 3,371,525 to Mitchell, a cylinder pressure sensor is mounted in a mounting bore formed in a cylinder head of an engine adjacent an engine cylinder. The pressure sensor includes a cylindrical shaped tubular body positioned in a cylindrical mounting bore sized larger than the sensor body to form an annular gap surrounding the tubular body. The inner end of the tubular body includes threads for engaging the cylinder head inside the mounting bore to secure the sensor in the bore. A sealing nut with a beveled edge is provided on the outer end of the sensor body for engaging an O-ring to prevent contaminants from entering the mounting bore. The sensor and mounting bore are necessarily positioned in close proximity to hot combustion and exhaust gases. As a result, after extended operation, removal of the sensor can be difficult due to oxidation and corrosion in the narrow annulus surrounding the sensor. The corrosion and build-up of residue fills the annulus thus binding the sensor to the inner wall of the mounting bore. The sensor is removed by rotating the sensor so that the sensor unscrews from the threads in the bore and moves outwardly out of the bore. Other sensors use a mounting nut positioned on the outer end of the sensor for relative rotational movement so as to engage and disengage threads formed on the outer end of the mounting bore. In both designs, the bond between the sensor and mounting bore created by the corrosion and residue will be broken or loosened by the rotation of the sensor or nut. However, as the sensor is then pulled from the mounting bore, the corrosion residue continues to obstruct the removal of the sensor making removal difficult and time consuming. Also, the O-ring may be damaged during engine operation by excessive gas pressure in the annular gap. The excessive gas pressure develops as a result of an increase in the temperature of the gas in the annular gap surrounding the sensor body during engine operation and/or leakage of combustion gas through the threaded connection at the inner end of the sensor. The excessive pressure moves the seal from its seat disrupting the sealing ability of the seal thereby disadvantageously permitting contaminants to enter the mounting bore and damage and corrode the sensor.

U.S. Pat. No. 4,633,842 to Ikeda et al. discloses a sensor for an engine which includes a sensor body having a two cylindrical portions of respective constant diameters integrally connected by a beveled surface. The cylindrical portions of the sensor appear to be mounted in abutment with the inner annular walls forming the mounting bore. As a result, the high temperature corrosion and residue will likely bond the sensor to the bore wall thereby requiring burdensome and time consuming removal procedures.

U.S. Pat. No. 4,414,531 to Novak is noted for disclosing an oxygen sensor having a cone shaped insulator body positioned in a conical shaped bore of a mounting body. However, the insulator body and the mounting body appear to be connected by a bonding substance and, therefore, no clearance appears to exist between the sensor and body. Thus, this sensor is permanently connected and can not be easily removed from the bore.

U.S. Pat. No. 4,995,256 to Norlien et al. discloses a zirconia cell oxygen sensor having a conical probe positioned in a cylindrical, i.e. non-tapered, cavity. However, the sensor is not used to measure combustion gas of an engine and therefore, the cavity is not exposed to corrosive residue. Since the sensor body is conical and the cavity is cylindrical, the clearance between the sensor and bore does not increase as the sensor is pulled out.

German Patent No. 831166 to Saul discloses what appears to be a spark plug having an inner body having a tapered or conical inner body portion inserted into a tapered receiving bore formed in an outer body. A threaded nut, surrounding the inner body, includes an angled annular wall for compressing a seal. However, Saul no where suggests a sensor for sensing engine cylinder pressure and the disclosed spark plug tip does not include a seal. As a result, an annular gap between the inner and outer bodies is in continuous communication with the engine cylinder. Saul does not disclose a manner for venting the annular gap. In fact, the annular wall and opposing seal seat are positioned to compress the seal so as to apparently prevent sufficient flexing of the seal to allow venting. Moreover, the taper, or angle, of the conical portion is extremely large thereby disadvantageously creating a wide body incapable of conforming to the packaging constraints in the cylinder head of various engines.

Consequently, there is a need for an improved sensor assembly capable of permitting easy removal of the sensor from a mounting bore while preventing contaminants from entering the mounting bore throughout engine operation.

SUMMARY OF THE INVENTION

It is an object of the present invention, therefore, to overcome the disadvantages of the prior art and to provide a sensor assembly capable of being easily and quickly removed from a bore after extended use.

It is another object of the present invention to provide a sensor assembly for positioning in a bore to form an annular gap which minimizes the tendency of corrosive residue in the gap to obstruct the removal of the sensor from the bore.

It is yet another object of the present invention to provide a sensor assembly capable of minimizing the formation of residue in a mounting bore receiving the sensor.

It is a further object of the present invention to provide a sensor assembly capable of effectively preventing contaminants from entering the mounting bore throughout engine operation.

Another object of the present invention is to provide a sensor assembly which effectively permits the venting of high pressure gas from the mounting bore while preventing contaminants from entering the bore.

Yet another object of the present invention is provide a sensor assembly including a seal for sealing the outer end of the mounting bore which protects the seal from damage due to excessive bore pressure.

These and other objects are achieved by providing a sensor for mounting in a mounting bore formed in an engine support structure for sensing an engine condition, comprising an elongated sensor body including a distal end having a distal diameter, a connecting portion having a connecting diameter and spaced from the distal end, and an annular tapered portion extending from the distal end and the connecting portion. The connecting portion includes a threaded connector for engaging threads formed in the mounting bore. The distal end includes an annular sealing portion for sealingly engaging a distal end seat formed in the mounting bore. The distal diameter of the distal end is smaller than the connecting diameter of the connecting portion so that the annular tapered portion is frusto-conically shaped. The annular tapered portion is sized to form an annular gap between an outer surface of the annular tapered portion and the engine support structure forming the mounting bore.

The sensor body further includes an annular beveled surface positioned axially along the sensor body a spaced distance from the distal end. The annular beveled surface extends outwardly from a longitudinal axis of the sensor body away from the mounting bore when the sensor is mounted in the mounting bore. The sensor also includes an annular seal positioned in abutment with the annular beveled surface wherein the annular beveled surface extends at a predetermined bevel angle relative to the longitudinal axis so as to compress the seal when the sensor is mounted in the mounting bore while permitting movement of the seal in response to pressure forces in the mounting bore to release pressurized gas from the bore.

The outer surface of the annular tapered portion may extend at a predetermined taper angle less than three degrees from a longitudinal axis of the sensor body. The annular gap may extend axially along the entire length of the annular tapered portion. The predetermined bevel angle may be in the range of 35–55 degrees, and preferably is approximately 45 degrees.

The sensor is preferably mounted in an engine cylinder head for mounting on an engine and including a mounting bore. The mounting bore includes an inner end having a first diameter, a distal end seat positioned at the inner end of the mounting bore, an outer end having a second diameter larger than the first diameter, an engaging portion positioned at the outer end of the mounting bore, and a receiving portion extending between the inner and outer ends. The receiving portion includes at least two sections having different diameters. The receiving portion of the mounting bore may be frusto-conically shaped in a complementary manner to the sensor body. The receiving portion and the outer surface of the annular tapered surface may in fact extend at the same predetermined angle from the longitudinal axis. The connecting portion of the sensor may include a threaded connector for engaging threads formed in the mounting bore to connect the sensor to the cylinder head. The sensor body may further include an annular groove formed adjacent the annular beveled surface for receiving the annular seal. The cylinder head may include a seal seating surface wherein the annular beveled surface extends at an included angle relative to the sealing surface which is in the range of 35–55 degrees.

DETAILED DESCRIPTION OF THE PREFERRED EMBODIMENT

Figure 1:
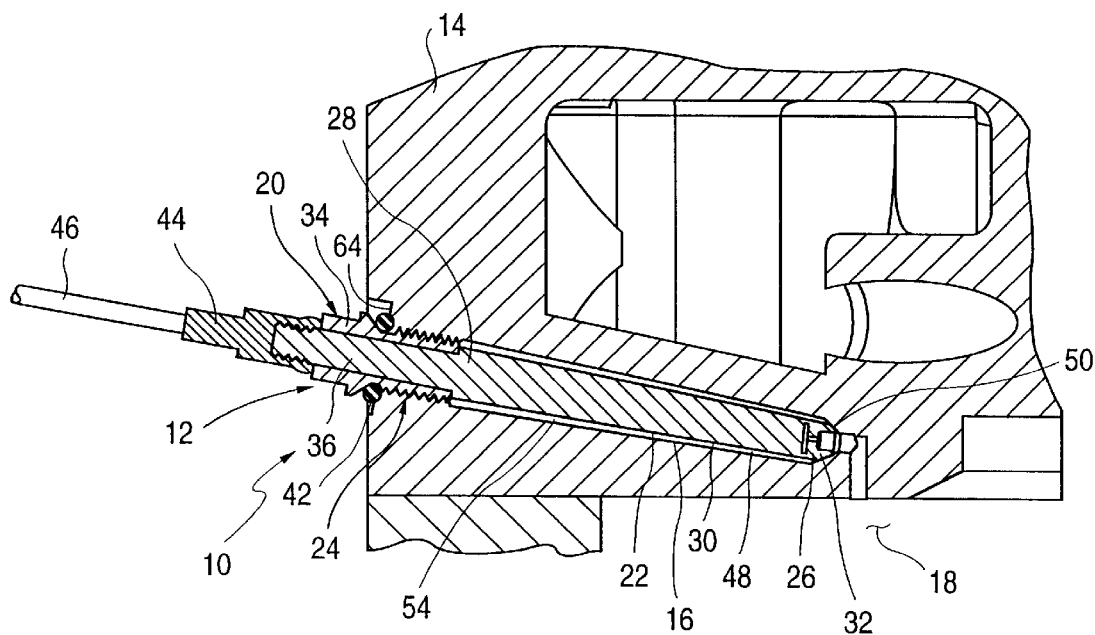
FIG. 1 is a partial cross-sectional view of the sensor assembly of the present invention as mounted in a mounting bore formed in an engine cylinder head.

Referring to FIG. 1, there is shown the sensor assembly of the present invention, indicated generally at 10, which includes the sensor 12 of the present invention and a support structure, i.e. cylinder head 14, containing a mounting bore 16 for receiving sensor 12. The present invention is directed to the mounting configuration and/or shape of sensor 12 and mounting bore 16 which effectively permits the easy removal of the sensor from the mounting bore. Although the details of sensor 12 are not shown, sensor 12 may be any conventional sensor capable of achieving a desired sensing function. For example, in the present case, sensor 12 is used to sense the gas pressure in an engine cylinder 18. Sensor 12 may be any sensor capable of effectively sensing the pressure, such as a conventional diaphragm-type sensor, capable of being modified, or formed with, to include one or more of the features of the present invention as discussed hereinbelow.

Sensor 12 includes an elongated sensor body 20 comprised of an annular tapered portion 22 and a connecting portion 24. Annular tapered portion 22 includes a small diameter distal end 26 for positioning at the inner end of mounting bore 16 and an outer end 28 having a slightly larger diameter than distal end 26. Annular tapered portion 22 is frusto-conically shaped with a generally smooth outer surface 30 extending from the small diameter distal end 26 to the outer end 28. Distal end 26 includes an annular sealing portion 32 for engaging the cylinder head 14 as discussed hereinbelow.

Connecting portion 24 includes a threaded connector 34 rotatably mounted on a cylindrical extension 36 extending from the outer end of annular tapered portion 22. Threaded connector 34 includes external threads for engaging internal threads formed on the outer end of mounting bore 16 for securely mounting sensor 12 on cylinder head 14 with annular tapered portion 22 positioned in mounting bore 16. As most clearly shown in FIG. 4, threaded connector 34 also includes an annular beveled surface 38 and an annular groove 40 for receiving an annular seal 42, such as an O-ring. Annular beveled surface 38 is designed to compress annular seal 42 to seal the outer end of mounting bore 16 while permitting expansion of annular seal 42 to vent high pressure gas from mounting bore 16 as discussed more fully hereinbelow.

The outer end of cylindrical extension 36 extends beyond the outer end of threaded connector 34 and includes threads for engaging complementary threads formed on a fitting 44 connected to a sensor cable 46. Sensor cable 46 may be any conventional cable capable of carrying the appropriate signal from sensor 12 to a signal receiving device (not shown).

As shown in FIG. 1, mounting bore 16 is also frusto-conically shaped and includes an inner end having a small diameter, an outer end having a larger diameter and a receiving portion 54 extending between the inner and outer ends. The diameter of mounting bore 16 adjacent annular tapered portion 22 of sensor body 20 is larger than the diameter of annular tapered portion 22 to form an annular gap 48 extending along substantially the entire annular tapered portion 22. The inner end of mounting bore 16 includes a distal end seat 50 for sealing abutment by the annular sealing portion 32 of sensor 12 to form a tip seal for substantially preventing combustion gases from entering annular gap 48. Annular sealing portion 32 and distal end seat 50 are designed with a frusto-conical shape having an angle necessary to prevent distal end seat 50 from permanently engaging annular sealing portion 32. The remaining portion of annular tapered portion 22 may then be formed with a relatively small taper without the risk of locking engagement between the sensor and the mounting bore by forming annular gap 48. As a result, sensor body 20 and mounting bore 16 can be formed with very small outer diameters as required by the cylinder head packaging constraints of many engines. As shown in FIG. 1, sensor 12 and mounting bore 16 must have a relatively small diameter to be able to be positioned between the lower face of the cylinder head 14 and the other cavities formed in head 14.

Figure 2:
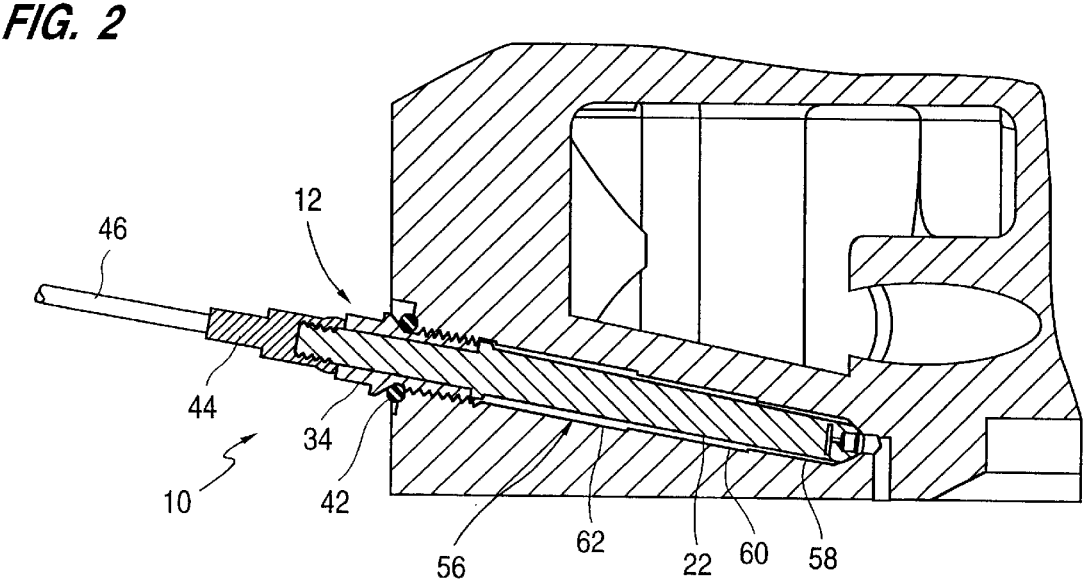
FIG. 2 is a partial cross-sectional view of a second embodiment of the sensor assembly of the present invention as mounted in a mounting bore formed in an engine cylinder head.
Figure 3:
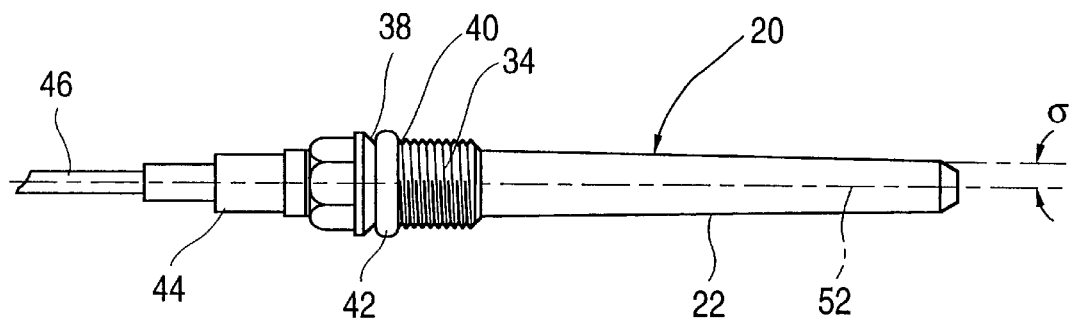
FIG. 3 is an elevational view of the sensor of the present invention.

The present invention is particularly advantageous in permitting the easy removal of sensor 12 from mounting bore 16. Specifically, the outer surface 30 of annular tapered portion 22 extends at a very small taper angle θ relative to the longitudinal axis of sensor 12 thus creating the slight frusto-conically shaped tapered portion 22. Specifically, the taper angle θ should be less than five degrees, and preferably less than three degrees. The taper angle θ of the sensor of FIGS. 1–3 is approximately one degree. This small degree of taper minimizes the width of the sensor assembly while achieving effective separation of the sensor from the bore during removal of the sensor as discussed hereinbelow. Importantly, receiving portion 54 of mounting bore 16 also extends from the inner end to the outer end at a very small taper angle. Preferably, the taper angle of receiving portion 54 of mounting bore 16 and the taper angle θ of tapered portion 22 of sensor 12 are approximately equal so that annular gap 48 has a relatively constant width. Although the inner surface of receiving portion 54 of mounting bore 16 may be frusto-conically shaped with a taper angle of the same magnitude, receiving portion 54 may also extend at a taper angle larger than the taper angle θ of annular tapered portion 22 of sensor body 20. However, the taper angle of mounting bore 16 must not be unnecessarily large so as to create a bore of excessive diameter incapable of being formed in cylinder head 14 without interfering with other cylinder head features or requiring an increase in the size of the cylinder head.

An alternative embodiment of the mounting bore is shown in FIG. 2, wherein the receiving portion 54 of the mounting bore may include a series of constant diameter sections 56 wherein the outer section has a larger diameter and each section proceeding toward the inner end of mounting bore 16 is designed with a smaller diameter than the adjacent outer section. Thus, cylindrical section 58 would have a smaller diameter than cylindrical section 60, which in turn would have a smaller diameter than section 62. The embodiment shown in FIG. 2 is easier to manufacture than the embodiment shown in FIG. 1 since each cylindrical section can be easily formed by a standard drilling operation without further machining.

With both the embodiments of FIGS. 1 and 2, the complementary tapering of annular tapered portion 22 of sensor body 20 and receiving portion 54 of mounting bore 16 causes the annular gap 48, adjacent any particular point along tapered portion 22, to increase as sensor 12 is removed from mounting bore 16. For example, as distal end 26 of sensor body 20 moves from the fully mounted/engaged position shown in FIG. 1 to the removed position of FIG. 3, the annular gap 48 between the outer surface of distal end 26 and the inner surface of receiving portion 54 of mounting bore 16 will gradually increase along the length of receiving portion 54. Importantly, this feature causes sensor body 20 to separate from and become increasingly spaced from any corrosive residue, accumulated in annular gap 48 during engine operation, as the sensor is removed from the bore. As a result, the corrosive residue is less likely to interfere with the removal of the sensor by, for instance, engaging, or frictionally rubbing, on adjacent surface or residue.

Figure 4:
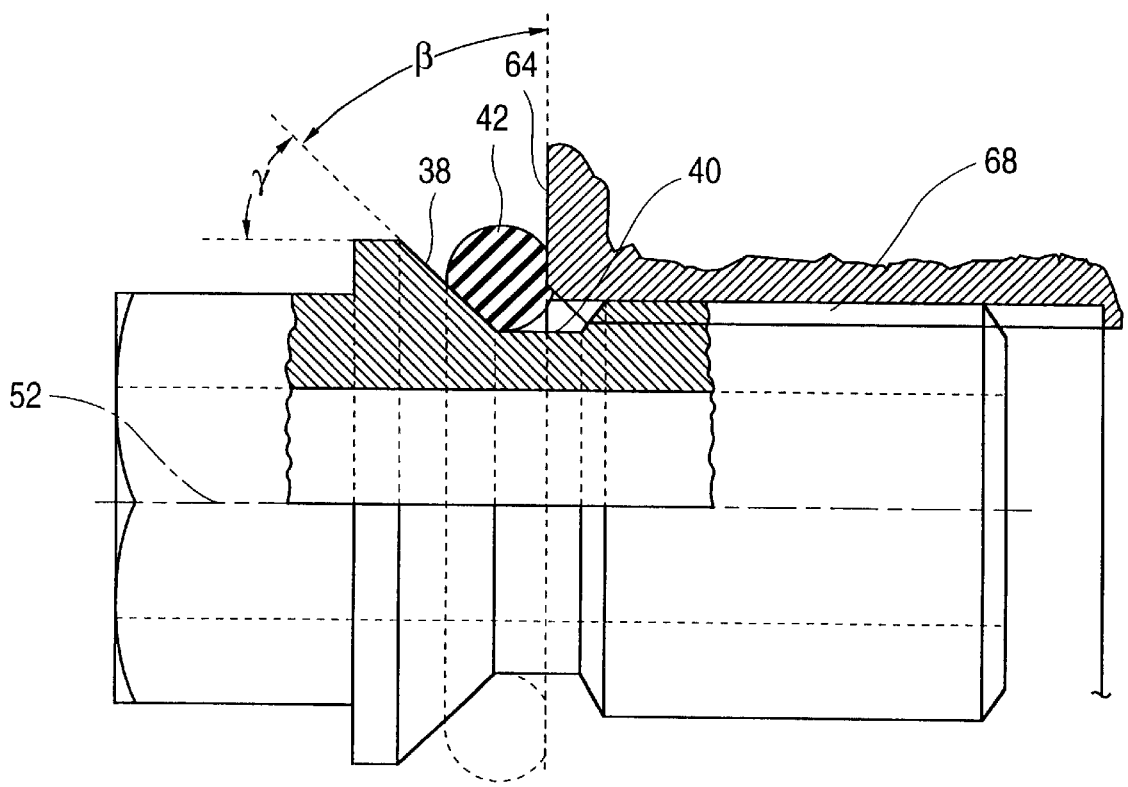
FIG. 4 is an enlarged, partial cross-sectional view of the sealing feature of the sensor of the present invention.

Referring now to FIG. 4, another aspect of the present invention will be described which effectively prevents contaminants from entering mounting bore 16 while preventing the destruction of annular seal 42 by over-pressurization of mounting bore 16. Specifically, annular beveled surface 38 extends outwardly from longitudinal axis 52 away from the mounting bore when sensor 12 is mounted in bore 16 at a bevel angle γ in the range of 35–55 degrees, and preferably approximately 45 degrees. This specific magnitude for bevel angle γ causes annular beveled surface 38 to be sufficiently positioned to place a positive axial force on annular seal 42 so as to create a positive seal against a seal seating surface 64 formed on cylinder head 14 around the outer end of mounting bore 16, while permitting annular seal 42 to flex outwardly in response to forces generated by gas pressure at the outer end of bore 16. During operation, the gas in annular gap 48 becomes pressurized due to the increase in temperature associated with an operating engine and possibly due to combustion gas leakage through distal end seat 50 into annular gap 48. When the gas pressure in annular gap 48 reaches a predetermined maximum level, annular seal 42 will flex away from annular beveled surface 38 and/or seal seating surface 64 to create a relief passage for the pressurized gas to flow to the atmosphere or cylinder overhead.

Seal seating surface 64 is preferably positioned perpendicular to longitudinal axis 52 so as to form an included angle β between seal seating surface 64 and annular beveled surface 38. Included angle β is of a magnitude in the range of 35–55 degrees and preferably approximately 45 degrees. By forming an included angle β in this range, the annular seal 42 will be allowed to expand outwardly under the force of gas pressure from mounting bore 16. Also, by ensuring that bevel angle γ is within the range of 35–55 degrees, annular beveled surface 38 is at least partially precluded from applying an insufficient axial force as would be applied by a beveled surface positioned at a lesser angle and from applying an excessive axial force tending to bind annular seal 42 and prevent venting flexure or movement of seal 42. During installation, threaded connector 34, with annular seal 42 positioned in annular groove 40, is rotated to threadably engage mounting bore 16 at the threaded connection 68. During this connection, annular seal 42 is compressed between annular beveled surface 38 and seal seating surface 64 in the manner shown in FIG. 4. Thus, annular seal 42 becomes positioned in the narrow inner portion of the annular recess formed between surfaces 38 and 64 as defined by included angle β. However, due to the relative positioning of annular beveled surface 38 and seal seating surface 64 as defined by bevel angle γ and included angle β, the annular space between surfaces 38 and 64 is much larger at a position radially outward from annular seal 42 than the space occupied by seal 42. Thus, seal 42 can easily expand outwardly or flex away from one of its seats against surfaces 38, 64 to relieve gas pressure from mounting bore 16. It should be noted that threaded connection 68 is designed to securely connect sensor 12 to cylinder head 14, but does not function as a seal. Therefore, gas pressure in annular gap 48 will also be experienced on the outer side of threaded connection 68 adjacent annular seal 42.

During assembly, distal end 26 of sensor 12 is inserted into mounting bore 16 until the threads of threaded connector 34 engage the inner threads of mounting bore 16. Threaded connector 34 is then rotated thereby moving annular tapered portion 22 inwardly into mounting bore 16 and annular sealing portion 32 into sealing abutment against distal end seat 50. As the appropriate torque is placed on threaded connector 34, annular seal 42 is compressed between annular beveled surface 38 and seal seating surface 64 as shown in FIG. 4. During engine operation, existing moisture and contaminants in mounting bore 16 may form a residue in annular gap 48. In addition, the hot combustion and exhaust gases which may leak by the distal end seat 50 into annular gap 48, create a corrosive residue in annular gap 48. As a result, the accumulation of corrosive residue in annular gap 48 tends to span the annular gap 48 at one or more locations. During removal of sensor 12 from mounting bore 16, threaded connector 34 is rotated counterclockwise which causes annular tapered portion 22 to be backed out of, or pulled from, receiving portion 54 of mounting bore 16. With respect to conventional sensor assemblies, during the initial movement, any corrosive residue formed on the outer surface of the sensor body or on the inner surface of the bore could interfere with the removal of sensor 12 by catching on other residue particles or rubbing against one of the opposing surfaces. However, with the pressure sensor 12 of the present invention, the tapered sensor body and mounting bore design causes the surfaces of the mounting bore and sensor to be increasingly separated as the sensor is removed from the bore thereby reducing the likelihood of the residue interfering with the movement of the sensor from the bore. In addition, any pressurized gas in annular gap 48 due to increasing temperatures and/or combustion gas leakage through distal end seat 50, will be vented by annular seal 42. Seal 42 will flex when the gas pressure reaches a predetermined maximum level to permit the gas to pass around annular seal 42 thereby relieving the gas pressure in annular gap 48. Annular seal 42 will then flex back to its original position in sealing engagement with annular beveled surface 38 and seal seating surface 64. In conventional sensor designs, the annular seal is prevented from venting movement by being bound by the surfaces compressing the seal. Upon over-pressurization of the annular gap in conventional designs, the annular seal becomes permanently damaged or moves into a new position which may or may not vent annular gap 48 and may not return to its original sealing position due to the orientation of the opposing seating surfaces. As a result, upon over-pressurization of the mounting bore in prior art designs, the annular seal often creates a permanent passage way which then permits contaminants, such as water, oil, etc., to enter mounting bore 16 causing excessive corrosion and damage to the sensor. Moreover, any contaminants in the bore may undesirably leak into the engine cylinder when the sensor is removed. The seal design of the present invention, however, permits the pressurized gas to be effectively relieved without damage to annular seal 42 thereby effectively sealing mounting bore 16 at all times during engine operation. Thus, the present invention creates a sensor assembly which can be easily removed from its mounting bore even in the event of corrosive residue built-up in the annular gap surrounding the sensor while preventing contaminants from entering the annular gap throughout engine operation by effectively venting pressurized gases without damage to the annular seal sealing the mounting bore.

INDUSTRIAL APPLICABILITY

The sensor and sensor assembly of the present invention may be used in conjunction with practically any sensor technology capable of being incorporated into an elongated, tapered sensor body. The present sensor and sensor assembly is particularly useful for a pressure sensor used to measure the pressure in the cylinder of an internal combustion engine.

We claim:

1. A sensor for mounting in a mounting bore formed in an engine support structure for sensing an engine condition, comprising:

an elongated sensor body including a distal end having a distal diameter, a connecting portion having a connecting diameter and spaced from said distal end, and an annular tapered portion extending between said distal end and said connecting portion, said connecting portion including a threaded connector for engaging threads formed in the mounting bore, said distal end including an annular sealing portion for sealingly engaging a distal end seat formed in the mounting bore, said distal diameter of said distal end being smaller than said connecting diameter of said connecting portion, said annular tapered portion being frusto-conically shaped, said annular tapered portion sized to form a continuous annular gap between an outer surface of said annular tapered portion and the engine support structure forming the mounting bore wherein said continuous annular gap extends continuously along said annular tapered portion between said distal end and said connecting portion.

2. The sensor of claim 1, wherein said sensor body further includes an annular beveled surface positioned axially along said sensor body a spaced distance from said distal end, said annular beveled surface extending outwardly from a longitudinal axis of said sensor body in a direction away from said distal end and said mounting bore when the sensor is mounted in the mounting bore, further including an annular seal positioned in abutment with said annular beveled surface, wherein said annular beveled surface extends at a predetermined bevel angle relative to the longitudinal axis so as to compress said seal when the sensor is mounted in the mounting bore while permitting movement of said seal in response to pressure forces in said mounting bore to release pressurized gas from the bore.

3. The sensor of claim 1, wherein said outer surface of said annular tapered portion extends at a predetermined taper angle less than three degrees from a longitudinal axis of said sensor body.

4. The sensor of claim 2, wherein said predetermined bevel angle is in the range of 35–55 degrees.

5. The sensor of claim 3, wherein said annular gap extends axially along the entire length of said annular tapered portion.

6. A sensor assembly for sensing an engine condition, comprising:

an engine cylinder head for mounting on an engine and including a mounting bore, said mounting bore including an inner end having a first diameter, a distal end seat positioned at said inner end of said mounting bore, an outer end having a second diameter larger than said first diameter, an engaging portion positioned at said outer end of said mounting bore, and a receiving portion extending between the inner and outer ends, said receiving portion having at least two sections with different diameters;

an elongated sensor body for positioning in said mounting bore, said sensor body including a distal end having a distal diameter, a connecting portion having a connecting diameter and spaced from said distal end, and an annular tapered portion extending axially along said sensor body between said distal end and said connecting portion, said connecting portion connectable to said engaging portion for securing said sensor body in said mounting bore, said distal end including an annular sealing portion for sealingly abutting said distal end seat formed in the mounting bore, said distal diameter of said distal end being smaller than said connecting diameter of said connecting portion, said annular tapered portion being frusto-conically shaped, said annular tapered portion sized to form a continuous annular gap between an outer surface of said annular tapered portion and the engine cylinder head forming the mounting bore wherein said continuous annular gap extends continuously along said annular tapered portion between said distal end and said connecting portion.

7. The sensor of claim 6, wherein said sensor body further includes an annular beveled surface positioned axially along said sensor body a spaced distance from said distal end, said annular beveled surface extending outwardly from a longitudinal axis of said sensor body in a direction away from said distal end and said mounting bore when the sensor is mounted in said mounting bore, further including an annular seal positioned in abutment with said annular beveled surface, wherein said annular beveled surface extends at a predetermined bevel angle relative to the longitudinal axis so as to compress said seal when the sensor is mounted in said mounting bore while permitting movement of said seal in response to pressure forces in said mounting bore to release pressurized gas from the mounting bore.

8. The sensor of claim 6, wherein said outer surface of said annular tapered portion extends at a predetermined taper angle less than three degrees from a longitudinal axis of said sensor body.

9. The sensor of claim 7, wherein said predetermined bevel angle is approximately 45 degrees.

10. The sensor of claim 6, wherein said receiving portion of said mounting bore is frusto-conically shaped.

11. The sensor of claim 10, wherein said receiving portion and said outer surface of said annular tapered surface extend at the same predetermined angle from said longitudinal axis.

12. The sensor of claim 6, wherein said connecting portion includes a threaded connector for engaging threads formed in said mounting bore.

13. The sensor of claim 7, wherein said sensor body further includes an annular groove formed adjacent said annular beveled surface for receiving said annular seal.

14. The sensor of claim 6, wherein said annular gap extends axially along the entire length of said annular tapered portion.

15. The sensor of claim 7, wherein said engine cylinder head further includes a seal seating surface and said annular beveled surface extends at an included angle relative to said sealing surface, said included angle being in the range of 35–55 degrees.

16. A sensor assembly for mounting in a mounting bore formed in an engine support structure for sensing an engine condition, comprising:

an elongated sensor body including a distal end and an annular beveled surface positioned along said sensor body a spaced distance from said distal end, said annular beveled surface extending outwardly from a longitudinal axis of said sensor body in a direction away from said distal end and said mounting bore when the sensor is mounted in the mounting bore;

an annular seal positioned in abutment with said annular beveled surface; and a seal seating surface facing said annular beveled surface for sealing abutment by said annular seal, said annular seal positioned between said seal seating surface and said annular beveled surface when said sensor body is mounted in the mounting bore, wherein said annular beveled surface extends at a predetermined bevel angle relative to the longitudinal axis so as to compress said seal when the sensor is mounted in the mounting bore to prevent contaminants from entering the mounting bore while permitting movement of said seal in response to pressure forces in the mounting bore to release pressurized gas from the mounting bore.

17. The sensor assembly of claim 16, wherein said sensor body further includes an annular groove formed adjacent said annular beveled surface for receiving said annular seal.

18. The sensor assembly of claim 16, wherein said seal seating surface is formed on an engine cylinder head and extends substantially perpendicular to the longitudinal axis of said sensor body.

19. The sensor assembly of claim 18, wherein said predetermined bevel angle is approximately 45 degrees.

20. The sensor assembly of claim 16, wherein said annular beveled surface extends at an included angle relative to said sealing surface, said included angle being in the range of 35–55 degrees.

* * * * *